UNITED STATES PATENT OFFICE.

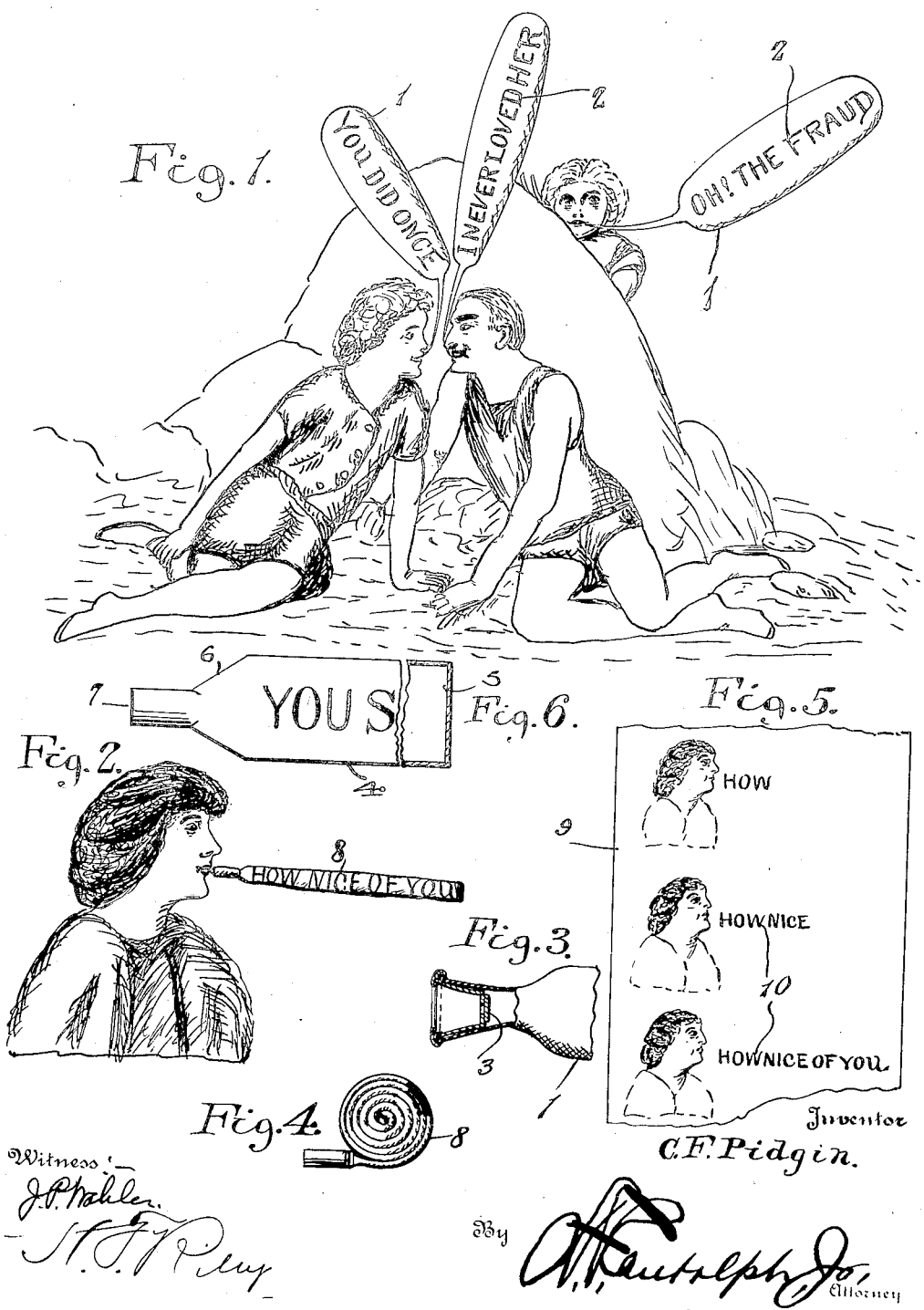

CHARLES F. PIDGIN, OF WINTHROP, MASSACHUSETTS, ASSIGNOR OF SIX-TENTHS TO HENRY A. JOHNSTON, OF RIVERDALE, MARYLAND.

MOTION-PICTURE AND METHOD OF PRODUCING THE SAME.

1,240,774.   Specification of Letters Patent.   Patented Sept. 18, 1917.

Application filed July 19, 1916. Serial No. 110,128.

*To all whom it may concern:*

Be it known that I, CHARLES F. PIDGIN, a citizen of the United States, residing at Winthrop, in the county of Suffolk and State of Massachusetts, have invented certain new and useful Improvements in Motion-Pictures and Methods of Producing the Same; and I do hereby declare the following to be a full, clear, and exact description of the invention, such as will enable others skilled in the art to which it appertains to make and use the same.

The invention relates to improvements in motion pictures and methods of producing the same.

In order to convey to the spectators of a photo-play or analogous motion picture productions, the full meaning of the picture shown, it often becomes necessary to add to the pictures themselves certain features, words, letters and so forth, which are shown on a separate screen. This separation of speech and action must necessarily be ineffective to a great degree and the primary object of the present invention is to show in the pictures themselves such salient speeches or expressions as will be necessary to explain visibly the dramatic situation depicted on the film.

It is also an object of the invention to enable the visible speech to appear on the screen with the visible words projected successively and aggregatively so as to simulate closely speech and thereby render the pictures more realistic.

Reference is had to the accompanying drawing in which,

Figure 1 is an elevation of a group of persons arranged to form a scene with visible speech, inflatable balloons being shown for carrying the words and for enabling them to be blown from the mouth of the characters, Fig. 2 is a similar view, the words being carried by an inflatable, extensible spirally coiled tube, Fig. 3 is a sectional view illustrating the construction of the balloon, Fig. 4 is a plan view partly in section illustrating the construction of the inflatable spirally coiled tube, Fig. 5 is an elevation of a portion of a film showing the words successively and aggregatively arranged thereon, Fig. 6 is a detail view of another form of paper bag or tube.

Like numerals of reference designate corresponding parts in the several figures of the drawing.

In carrying out the present invention the *dramatis personæ* speech is introduced or incorporated in a picture by means of an expansible inflatable device adapted to be blown up by the actors or characters of the picture, and in the accompanying drawing I have illustrated several devices adapted to be advantageously employed for this purpose. In Fig. 1 of the drawings, the words constituting the speech of the actors or characters are placed on balloons 1 of oblong shape adapted to be inflated to a relatively large size and normally occupying a comparatively small space with the words entirely invisible.

Any form or shape of balloon may be employed for this purpose and a series of pictures or exposures may be taken during the inflation of the balloons, which may be successively or simultaneously inflated according to the requirements of the photo-play or other motion picture production. The blowing or inflation of the devices by the various characters of a photo-play will add to the realism of the picture by the words appearing to come from the mouth of the players. The balloons may be made of rubber or any other suitable material and the words 2 or other characters, constituting the speech, may be applied to or placed on the balloons in any desired manner, and a suitable valve 3 will preferably be provided for maintaining the balloons or other inflatable device in an inflated or expanded condition. The size and length of the balloons may vary with the length of the speech of the actors or characters and both sides of the balloon may be utilized in the same scene or other scenes, and the balloons or other inflatable devices may be used over and over again by removing the words or characters placed thereon and substituting other words for the same. The inflation may be made by the characters by blowing into the devices, or the balloons and other devices may be inflated by suitable mechanism and be arranged in a position in line with the mouths of the actors or characters so that when the exposure is made and the picture taken the words will appear as issuing from the mouths of the respective actors or characters. The exposures may be made during the inflation of the balloons, or after the same have been inflated and the words or speech thereon fully exposed. Instead of making the balloon of rubber so as to be expansible, the inflatable device may consist of a bag or tube 4 of paper or any other suitable material 4, adapted to have painted, printed or otherwise placed on either or both of its sides, the words constituting the speech to be incorporated in the pictures. It is closed at the outer end 5 and the inner end 6, which is tapered, is provided with a neck 7 to enable it to be blown into by a person, or be connected with a suitable inflating apparatus. When a paper or similar inflatable inelastic device is employed, the words may be applied to the sides of the same by means of strips or slips of paper temporarily secured to the said device by any suitable means, such as adhesive material, clips, or the like so that they may be readily changed to permit the inflatable devices to be used a number of times, but the devices may be so cheaply constructed as to permit them to be thrown away and discarded after using one or both sides of the same.

In Figs. 2 and 4 of the drawing is illustrated a tube 8 of paper or other suitable material normally arranged in a spirally wound compact condition, as illustrated in Fig. 4, and adapted to be inflated and blown out straight as shown in Fig. 2 for exposing the words contained on its side. In the inflation of a device of this character a series of exposures or pictures may be made so that the words, by the unwinding of the spirally coiled tube, will successively and aggregatively appear on the film. Words may be placed on both sides of the spirally coiled tube 8, which is of the ordinary construction and which automatically recoils itself as soon as the device is relieved of fluid pressure by the operator ceasing to blow through it. In Fig. 5 of the drawing is illustrated a portion of a film 9, in which the words 10 successively appear through the unrolling of the coiled tube 8. In the making of a film of a photo-play or other picture production the characters or actors will be supplied with the inflatable devices with the proper speech thereon, and the said devices will be inflated at the proper intervals and exposures made by the camera, and the inflatable devices may be changed with the changes in the various scenes. In the development of the film, the outlines of the balloons, tubes or other inflatable devices will be penciled out so that the words only will appear in the pictures adjacent to the mouths of the actors or characters. The words issuing from the mouths of the actors or figures or apparently issuing from the same will enable the dramatic situation to be explained or other information to be conveyed simultaneously with the action and without the use of a separate screen or picture or marginal sign or inscription. When elastic expansible inflatable devices are employed for incorporating visible speech into pictures, the balloon or balloons may be gradually inflated so that the words will gradually increase in size on the screen and may be advantageously worked into the photo-play and the size of the speech may be increased with the increase of various emotions depicted on the screen. While I have illustrated several forms of inflatable and expansible devices it will be clear that various other constructions may be employed to produce the effect of words issuing from the mouths of the characters or actors and becoming visible in the pictures.

What is claimed is:—

1. The hereindescribed method of introducing visible speech into motion pictures which consists in placing words or other speech on an inflatable device, inflating the same so that the words contained on the device will appear as if issuing from the mouth of the actor or character, photographing the picture and eliminating from the picture the inflatable device without removing the words from the picture, so that the words without the inflatable device will appear on the completed picture.

2. The hereindescribed method of producing motion pictures with visible speech, which consists in placing the words or other characters composing the speech on an inflatable device, inflating the device by blowing into the same so that the words contained on the device will appear as issuing from the mouth of the person blowing into the device, photographing the picture, and eliminating from the completed picture the inflatable device without removing the words from the picture, so that the words alone will appear at the mouth of the person.

3. The hereindescribed method of producing motion pictures with visible speech, which consists in placing the words or other characters composing the speech on an inflatable device, inflating the device by blowing into the same so that the words contained on the device will appear as if issuing from the mouth of the person blowing into the device, photographing the picture, and eliminating from the negative the outline of the device so that only the words will appear in the finished picture at the mouth of the person.

4. The hereindescribed method of producing visible speech in motion pictures, which consists in placing the words of the speech on an inflatable device, blowing into the device to inflate the same gradually to bring the words of the speech successively into view, making a plurality of camera exposures of the same, and eliminating the inflatable device from the completed picture so that only the words will appear at the mouth of the person.

5. The hereindescribed method of introducing visible speech into motion pictures, which consists in placing the words of such speech on an inflatable expansible device, blowing into the same so as to bring the words of the speech successively into view, making a plurality of camera exposures of the same so that the words will appear successively and aggregatively in the finished picture, and removing from the negative the inflatable device without affecting the words.

In testimony whereof I affix my signature in presence of two witnesses.

CHARLES F. PIDGIN.

Witnesses:
   CHARLES F. TOTTEN,
   JAMES O. TERRY.